United States Patent [19]
Sherman et al.

[11] Patent Number: 5,925,284
[45] Date of Patent: Jul. 20, 1999

[54] SHAPED ARTICLE AND PROCESS FOR PREPARING THE ARTICLE

[75] Inventors: John D. Sherman, Inverness; Richard R. Willis, Cary; Robert L. Bedard, McHenry, all of Ill.; Albert S. Behan, Bronxville, N.Y.; Philip Connolly, Little Falls, N.J.

[73] Assignee: UOP, Des Plaines, Ill.

[21] Appl. No.: 08/806,006

[22] Filed: Feb. 24, 1997

[51] Int. Cl.⁶ ....................................................... C02F 5/02
[52] U.S. Cl. .................... 252/179; 210/681; 210/690; 210/694; 264/621; 423/157; 423/592; 501/12; 502/60; 502/64; 502/66; 502/68
[58] Field of Search ................... 507/60, 64, 66, 507/68; 252/179; 264/621; 501/12; 210/681, 690, 694; 423/157, 592

[56] References Cited

U.S. PATENT DOCUMENTS

| | | |
|---|---|---|
| 4,013,732 | 3/1977 | Chang et al. . |
| 4,661,282 | 4/1987 | Clark ........................................ 252/179 |
| 4,929,381 | 5/1990 | Clark ........................................ 252/179 |
| 4,952,544 | 8/1990 | McCauley ................................. 502/68 |
| 5,053,374 | 10/1991 | Absil et al. ................................ 502/64 |
| 5,182,242 | 1/1993 | Marler ....................................... 502/66 |
| 5,518,707 | 5/1996 | Bedard et al. ............................ 423/700 |

FOREIGN PATENT DOCUMENTS

WO 94/19277  9/1994  WIPO .

OTHER PUBLICATIONS

Dines et al. (1981) *Inorg. Chem.*/20/92–92/Derivatized Lamellar Phosphates and Phosphonates of M(IV) Ions.
Yamanaka (1976) *Inorg. Chem.*/15/2811–2817/Synthesis and Characterization of the Organic Derivatives of Zirconium Phosphate.

*Primary Examiner*—John M. Cooney, Jr.
*Attorney, Agent, or Firm*—Thomas K. McBride; Frank S. Molinaro

[57] ABSTRACT

Applicants have developed a unique process for preparing a shaped article comprising an ion exchange composition and a hydroxy oxide binder. The ion exchange compositions include metallotitanates, metallogermanates, pillared clays and metal phosphonates. The process involves combining the ion exchange composition with a binder precursor and water, forming the mixture into a shaped article and heating the article at a temperature of about 85° C. to about 120° C. These shaped articles are useful for removing metal ions such as cesium from feed streams.

14 Claims, No Drawings

SHAPED ARTICLE AND PROCESS FOR PREPARING THE ARTICLE

FIELD OF THE INVENTION

This invention relates to a shaped article comprising an ion exchange composition and a hydroxy oxide binder and to a process for preparing the article.

BACKGROUND OF THE INVENTION

Ion exchange compositions are well known in the art and include molecular sieves, clays, and even non-porous inorganic oxides. These compositions are synthesized as powders, but owing to various reasons, e.g., back pressure, must be formed into shaped articles such as extrudates, pellets, pills, spheres, etc., in order to be commercially useful. When formed into various shapes, the articles must possess sufficient physical strength to withstand abrasion or attrition and fracture during use, loading and transit.

In forming such shaped articles it is usual to use a binder or matrix material which can provide such strength yet will not interfere with the properties of the ion exchange composition. Commonly used matrix materials or binders include aluminas and clays since these materials can be mixed easily with the ion exchange compositions and can be formed into shaped articles easily by using techniques such as extrusion.

The art also discloses the use of other binders or matrix materials. For example, U.S. Pat. No. 4,013,732 discloses silica as a matrix material in conjunction with ZSM-5 zeolite. Another reference is U.S. Pat. No. 5,182,242 which discloses the use of a low acidity refractory oxide binder and a hydroxy and/or alkoxy-bridged metallopolymer. The low acidity oxide binders include titania, zirconia and silica, while the hydroxy or alkoxy bridged metallo-polymers include zirconium acetate and titanium methoxide. After the article is formed, e.g., extruded, it is calcined at a temperature of about 260° C. to about 815° C. Finally, U.S. Pat. No. 5,053,374 discloses a process for preparing zeolite catalysts bound with low acidity binders such as silica, titania, etc. The process involves preparing a homogeneous mixture of zeolite, water and low acidity binder in colloidal form. The mixture is extruded, dried and calcined to provide the catalyst.

One common feature of the processes described above is that the extrudates or shaped articles are calcined at relatively high temperatures. It would be advantageous to bind these ion exchange compositions without the high temperature firing step, allowing for a lower cost process for making the shaped articles. Applicants have found that the firing step can be eliminated by using as the binder a hydroxy metal oxide, e.g., hydroxy zirconium oxide. Surprisingly, by using a binder precursor, e.g., zirconyl hydroxychloride and heating the article to temperatures of only about 85° C. to about 120° C. one obtains an article which has good strength and high attrition resistance.

SUMMARY OF THE INVENTION

As stated, the present invention relates to a process for preparing a shaped article and to the shaped article itself. Accordingly, one embodiment of the invention is a process for preparing a shaped article containing an ion exchange composition, the process comprising mixing an ion exchange composition, a binder precursor and water to form a mixture, forming the mixture into a shaped article and heating the article at a temperature of about 85° C. to about 120° C. thereby converting the binder precursor to a hydroxy metal oxide binder.

Another embodiment of the invention is a shaped article comprising an ion exchange composition and a hydroxy metal oxide binder.

These and other objects and embodiments will become more apparent after a detailed description of the invention.

DETAILED DESCRIPTION OF THE INVENTION

One essential element of the present invention is an ion exchange composition. By ion exchange composition is meant that the composition is able to selectively exchange a cation present in its structure for one in a feed stream. The ion exchange compositions which can be used in this invention include but are not limited to metallotitanates, metallogermanates, pillared clays and metal phosphonates. Examples of metallotitanates include the silicotitanates and substituted silicotitanates, e.g., niobium substituted silicotitanates, disclosed in WO 94/19277 which is incorporated by reference. Specifically, a metallosilicate having an intergrowth of the sitinakite and pharmacosiderite structures is described in U.S. application No. 08/439,454 which is incorporated by reference. Metallogermanates are described in U.S. Pat. No. 5,518,707 which is incorporated by reference. Pillared clays are expandable clays which contain pillars between the clay layers. Examples of clays which have ion exchange capacity and can be pillared include montmorillonite, sauconite, nontronite, saponite and hectorite. These pillared clays are described in U.S. Pat. No. 4,952,544 which discloses the use of aluminum chlorhydroxide having a rare earth included in the pillar. Other pillars such as zirconium are also described in the '544 patent which is incorporated by reference.

Metallophosphonates are also well known in the art as shown by the articles of M. B. Dines and P. M. DiGiacomo in *Inorg. Chem.*, 20, 92–97 (1981) and S. Yamanaka in *Inorg. Chem.*, 15, 2811–2817 (1976). Generally these materials are prepared by reacting the desired phosphoric acid with a metal salt of the desired metal. For example 2-carboxyethyl phosphoric acid is reacted with zirconyl chloride under reflux conditions to give a product having the formula $Zr(O_3PCH_2CO_2H)_2$.

The preparation of silicotitanates and substituted silicotitanates can be found in WO 94/19277. Generally the silicotitanates are prepared from reactive sources of silicon, titanium, a templating agent and optional metal sources. Sources of silicon include colloidal silica, tetraethyl orthosilicate, etc. Titanium sources include titanium alkoxides, e.g., tetraisopropyl titanate, titanium halides, titanium oxide, etc. The templating agent can be an alkali or alkaline earth metal hydroxide or tetraalkylammonium salts. Specific examples include NaOH, KOH and tetramethylammonium hydroxide. Metals such as niobium in the form of niobium oxide can optionally be added. These components are formed into a mixture and reacted at temperatures of about 140° C. to about 250° C. for a time sufficient to form the silicotitanate, which is generally in the range of about 1 to about 120 hours.

Another essential element of the process of the present invention is a binder precursor which when heated as described below will be converted to a hydroxy metal oxide binder. The metal which will constitute the hydroxy metal oxide binder is selected from zirconium, titanium and mixtures thereof. The binder precursors are metal compounds which can form a gel when its pH is changed. Examples of the binder precursors which can be used, include but are not limited to zirconium tetrapropoxide, zirconium acetate solution, zirconyl hydroxychloride, zirconyl oxychloride, zirconyl orthosulfate, zirconyl oxynitrate, and the titanium analogs of the above named compounds.

The binder precursor is conveniently mixed with water, to which the desired ion exchange composition is added or vice versa to form a mixture. The amount of precursor in the mixture can vary considerably, but is generally the amount necessary to give from about 10 to about 50 wt. % of hydroxy metal oxide in the finished shaped article. The resultant mixture is homogeneously mixed by means well known in the art such as mulling, kneading, shearing, stirring, etc. Water is usually added to the mixture before or during mixing to obtain the appropriate consistency required for the desired forming means. The amount of water which is added will also determine the type of mixing means to be used.

Since the binder precursor undergoes gelation during preparation of the shaped article, it is important to control the gelation rate of the precursor. Failure to control the gelation rate can result in an inhomogeneous mixture of the binder and ion exchange composition or result in the binder/composition mixture being turned into an unworkable mass. For example, a large or drastic shift in pH can occur when a very basic ion exchange composition is mixed with a very acidic binder precursor. Examples of these very basic compositions are alkali silicotitanates, or alkali metallogermantes, while clays are only slightly basic.

If it is found that the ion exchange composition is too basic and causes premature gelation, it can be treated to reduce its basicity. This can be done by treating the composition with an acid solution such as nitric acid, hydrochloric acid, etc. followed by filtration and washing with water. This procedure is carried out until the resultant acid washed ion exchange composition when mixed with the binder precursor gives a homogeneous and workable mixture or slurry.

An alternative way to prepare a mixture of the binder precursor and ion exchange composition is to first gel the precursor and then mix it with the composition. One convenient manner of gel ling the binder precursor is by preparing an aqueous solution of a base such as sodium hydroxide, potassium hydroxide, etc. and adding the binder precursor to it. The resultant slurry is filtered, the solid washed and then mixed with the desired ion exchange composition. When preparing an article using a gelled binder precursor and a very basic ion exchange composition, it is not necessary to treat the ion exchange composition with an acid, although it is preferred to do so.

Having obtained a homogeneous mixture, it is now formed into a desired shape by forming means well known in the art. These forming means include extrusion, spray drying, oil dropping, conical screw mixing, etc. Extrusion means include screw extruders and extrusion presses. As mentioned above, the forming means will determine how much water, if any, is added to the mixture. Thus, if extrusion is used, then the mixture should be in the form of a dough, whereas if spray drying or oil dropping is used, then enough water needs to be present in order to form a slurry.

Having formed the mixture into a desired article, it is next heated at temperatures of about 85° C. to about 120° C. Heating at these low temperatures sets the binder but does not convert it to the oxide. Therefore, one obtains a shaped article comprising an ion exchange composition and a hydroxy metal oxide binder. By a hydroxy metal oxide is meant an oxide having the empirical formula $MO_2.xH_2O$ where x ranges from about 2 to about 4 and M is zirconium or titanium. The hydroxy metal oxide is x-ray amorphous or poorly crystalline.

The shaped articles of this invention are useful as adsorbents and as selective ion exchangers. Specifically these articles are useful as selective ion exchangers of various contaminant metal ions from liquid streams such as aqueous streams thereby removing these metal ions from the liquid streams. Illustrative of the contaminant metal ions which can be removed from liquid streams are cesium, strontium, mercury, silver, lead, transition metal, lanthanide metal and actinide metal ions. These metal ions can be removed from the liquid stream by contacting the stream with the shaped article for a time sufficient to remove the metal ions and trap them on the article. The contacting can be carried out either in a batch mode or in a continuous mode. In a batch mode, the shaped article is placed in an appropriate container and the stream to be treated mixed therewith. Contacting is carried out for a time of about 0.1 to about 100 hr. In a continuous mode, the article is placed in a column and the stream to be treated is flowed through it, usually downflow, until the contaminant metal ion is detected in the effluent of the column. The metal ion containing article can either be disposed of or it can be regenerated by eluting with a solvent containing ions that can be exchanged for the trapped metal ions and concentrate the ions in the eluting solvent.

In order to more fully illustrate the instant invention, the following examples are set forth. It is to be understood that the examples are only by way of illustration and are not intended as an undue limitation on the broad scope of the invention as set forth in the appended claims.

EXAMPLE 1

In a reaction vessel there were added 10,969 grams of water, 757 grams of a 50% sodium hydroxide solution, 288 grams of niobium oxide, 896 grams of a tetraethylorthosilicate solution (98% by weight) and 1,090 grams of titanium isopropoxide solution (97% by weight). The pH of the resultant gel was about 13. The gel was stirred and heated to 195° C. over 6 hours and was held there for 24 hours with stirring. The vessel was cooled to room temperature, the solid was filtered, washed with water and dried for several hours at 100° C. X-ray analysis showed the product to be a crystalline silicotitanate as described in WO 94/19277 (Table 9). The powder was analyzed and found to contain: 14.7% Nb; 8.29% Si; 20.7% Ti; 10.9% Na and 1.89% Al.

EXAMPLE 2

A sample of a silicotitanate prepared as in example 1 and containing 14.4 wt. % $Na_2O$ was acid washed as follows. In a vessel there were mixed 200 pounds of the silicotitanate ion exchange composition, 45 pounds of concentrated nitric acid (70 wt. % $HNO_3$). The resultant slurry was agitated for one hour at ambient temperature, filtered and washed with 200 gallons of water. The final product contained 8.3 wt. % $Na_2O$.

EXAMPLE 3

Extrudates were prepared by first mulling 1,808 grams of the acid washed silicotitanate of example 2. To the muller, 1,333 g of zirconyl hydroxychloride $(ZrO(OH)Cl.xH_2O)$ were added and the resultant mixture kneaded for 10 minutes. Next, 373 grams of water were added to increase the extrudability of the dough and mulling was continued for an additional 30 minutes. About one half of the mixture was extruded on a piston extruder using a 1.78 mm die plate. The resultant extrudates were dried overnight under ambient conditions and then heated at 100° C. for two hours. The dried extrudate was next lightly crushed to give particles of about 250 to about 600 microns in diameter. Finally, these particles were washed with a 10 wt. % sodium carbonate solution to insure complete neutralization of the binder and then dried at 100° C. This sample was identified as sample A.

EXAMPLE 4

To one-half of the mixture from example 3 there were added 10 grams of glycerin and the mixture mulled for 10 minutes. This dough was now extruded using an auger type extruder. The resultant extrudates were treated, i.e., dried, washed, etc. as in example 3. This sample was labeled sample B.

EXAMPLE 5

In a muller, 4,000 grams of zirconyl hydroxychloride and 5,647 grams of the silicotitanate of example 2 were kneaded together for 30 minutes. To this mixture there were added 444 grams of water and the resultant mixture mulled an additional 15 minutes. This mixture was now formed into beads using a conical screw mixer. The spherical beads which were produced had an average diameter of about 250 to about 600 microns. The beads were dried in air overnight and then heated to 100° C. for two hours. Finally about 500 g of these beads were washed twice with one liter of water for one hour and then dried overnight in air. This sample was identified as sample C.

Another 500 grams of the beads described above (before the water wash) were washed with 4 liters of a 5 wt. % sodium hydroxide solution over a 5 hour period followed by washing with 1 liter of a 0.1 N sodium hydroxide solution for 1 hour. The treated beads were rinsed three times with 1 liter portions of water and then dried in air overnight. This sample was identified as sample D.

EXAMPLE 6

In a muller there were mixed 3,519 grams of silicotitanate from example 2, 3,759 grams of fines prepared by crushing beads of sample D and 2,400 grams of zirconyl hydroxychloride and the mixture mulled for 25 minutes. To this resultant dough there were added 199 grams of water followed by an additional kneading of 15 minutes. This final mixture was formed into beads by using a conical screw mixer. Beads having diameters of about 250 to about 600 microns (76% yield) were obtained. This sample was identified as sample E.

EXAMPLE 7

In a container containing 20 L of a 50 wt. % sodium hydroxide solution, there were added 5000 grams of zirconyl hydroxychloride and the mixture mixed for one hour. The slurry was then filtered and washed with water.

In a muller 4,224 of the above gelled product were mixed with 2,887 of silicotitanate from example 2 and the mixture mulled for 10 minutes and then extruded using a piston extruder as per example 3. This sample was identified as sample F.

EXAMPLE 8

A slurry of silicotitanate in water was prepared by mixing 214 g of silicotitanate from example 2 and 300 g of water and milling for 2 minutes. In a separate container 39 g of 40 wt. % solution of hexamethylene-tetraamine (HMT) were mixed with water and chilled to 10° to 15° C. This chilled HMT solution was added with stirring to a chilled solution of zirconyl hydroxychloride (357 g) and urea (23 g). The silicotitanate slurry was now added to the chilled mixture and vigorously stirred. The resultant slurry was dropped into an oil tower maintained at 100° C. Spheres measuring 1 mm in diameter were removed from the bottom of the tower, aged overnight at 95° C. in oil, washed with an ammoniated water solution at 95° C. followed by washing with a 1 wt. % NaOH solution and dried at 95° C. for two hours. This sample was identified as sample G.

EXAMPLE 9

Samples A–G were tested for attrition resistance using the following procedure. To a container there were added 25 g of the respective sample and 75 ml of deionized water. The container was placed on a paint shaker and agitated for 5 minutes. The mixture was filtered through a 100 mesh screen and the container containing the water and any fines heated to 220° C. for at least 4½ hours or until the mixture was completely dry.

The water attrition was calculated using the following formula and the results are presented in Table 1.

$$\% \text{ Water Attrition Loss} = \frac{(A - B)}{C} \times 100\%$$

A=weight of container plus residue
B=tare weight of container
C=original weight of sample.

TABLE 1

ATTRITION OF VARIOUS ION EXCHANGE SHAPED ARTICLES

| Sample I.D. | Wet Attrition (%) |
|---|---|
| A | >15 |
| B | >15 |
| C | >15 |
| D | 2.6 |
| E | 2.1 |
| F | 12.1 |
| G | 1.4 |

EXAMPLE 10

Samples A–G were tested to determined their ability to exchange cesium by determining their cesium distribution coefficients ($K_d$) as follows.

On hundred milligrams of the sample was placed into a 25 mL polyethylene terephthalate (PET) plastic vial. To this vial there were added 10 mL of a solution containing 5.7 M $NaNO_3$, 0.6 M NaOH and a 100 mg/L concentration of cesium chloride solution. The vial was capped and placed in an environmental orbital shaker maintained at 25° C. The sample was agitated for about 18 hours at 300 revolutions per minute, removed from the shaker and the powder material allowed to settle. Next the supernate was vacuum filtered with a 0.2 micron membrane filter, diluted 10:1 and then analyzed for cesium by flame atomic absorption spectroscopy.

The $K_d$ value was calculated using the following formula:

$$K_d \text{ (mL/g)} = \frac{(V)(Ac)}{(W)(Sc)}$$

where: V=volume of waste stimulant (mL)
Ac=concentration of cation absorbed on ion-exchanger (g/mL)
W=mass of ion-exchanger evaluated (g)
Sc=concentration of cation in post reaction supernate (g/mL)

The $K_d$ of each sample was compared to that of an unbound form, i.e., powder, of the silicotitanate of Example 1. What is presented in Table 2 is the selectivity relative to the powdered composition.

TABLE 2

Relative $K_d$ of Various Ion Exchange Shaped Articles

| Sample I.D. | Relative $K_d$ |
|---|---|
| Unbound powder | 1.0 |
| A | NA* |
| B | 0.31 |
| C | NA* |
| D | 0.42 |
| E | 0.62 |
| F | 0.72 |
| G | 0.9 |

*Not Analyzed

What is claimed is:

1. A process for preparing a shaped article containing a cation exchange composition; the process comprising mixing a cation exchange composition, selected from the group consisting of metallotitanates, metallogermanates, pillared clays, and mixtures thereof, a zirconium, titanium or mixture thereof binder precursor and water to form a mixture, forming the mixture into a shaped article and heating the article at a temperature of about 85° C. to about 120° C. thereby converting the binder precursor to a hydroxy metal oxide binder, where the metal is zirconium, titanium, or a mixture thereof.

2. The process of claim 1 where the binder precursor is selected from the group consisting of zirconyl hydroxychloride, zirconium tetrapropoxide, zirconium acetate solution, zirconyl oxychloride, zirconyl orthosulfate, zirconyl oxynitrate, titanyl hydroxychloride, titanium tetrapropoxide, titanyl oxychloride, titanyl orthosulfate and titanyl oxynitrate.

3. The process of claim 1 where the binder precursor is present in an amount sufficient to provide from about 10 to about 50 wt. % of hydroxy metal oxide binder in the shaped article.

4. The process of claim 1 where the mixture is formed into an extrudate.

5. The process of claim 1 where the mixture is formed into beads.

6. The process of claim 1 where the mixture is formed into spheres.

7. A shaped article comprising a cation exchange composition selected from the group consisting of metallotitanates, metallogermanates, pillared clays and mixtures thereof and a hydroxy metal oxide binder, where the metal is selected from the group consisting of zirconium, titanium and mixtures thereof.

8. The article of claim 7 where the binder is present in an amount from about 10 to about 50 wt. % of the article.

9. The article of claim 7 where the cation exchange composition is a niobium silicotitanate and the binder is hydroxy zirconium oxide.

10. A process for preparing a shaped article containing a cation exchange composition; the process comprising mixing a cation exchange composition selected from the group consisting of metallotitanates, metallogermanates, pillared clays and mixtures thereof and a zirconium, titanium or mixtures thereof gelled binder precursor to form a mixture, forming the mixture into a shaped article and heating the article at a temperature of about 85° C. to about 120° C., thereby converting the binder precursor to a hydroxy metal oxide binder, where the metal is selected from the group consisting of zirconium, titanium and mixtures thereof.

11. The process of claim 10 where the binder precursor is selected from the group consisting of zirconyl hydroxychloride, zirconium tetrapropoxide, zirconium acetate solution, zirconyl oxychloride, zirconyl orthosulfate, zirconyl oxynitrate, titanyl hydroxychloride, titanyl oxychloride, titanyl orthosulfate and titanyl oxynitrate.

12. The process of claim 10 where the binder precursor is present in an amount sufficient to provide from about 10 to about 50 wt. % of hydroxy metal oxide binder in the shaped article.

13. The process of claim 10 where the mixture is formed into an extrudate.

14. The process of claim 10 where the mixture is formed into beads.

* * * * *